(12) United States Patent
Gronquist

(10) Patent No.: US 7,520,535 B2
(45) Date of Patent: *Apr. 21, 2009

(54) PIPELINE JOINT INFILL AND PROTECTIVE SLEEVE

(75) Inventor: Guy G. Gronquist, Katy, TX (US)

(73) Assignee: Offshore Joint Services, Inc., Katy, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/012,944

(22) Filed: Feb. 6, 2008

(65) Prior Publication Data

US 2008/0136171 A1   Jun. 12, 2008

Related U.S. Application Data

(62) Division of application No. 10/943,578, filed on Sep. 17, 2004, now Pat. No. 7,407,197.

(51) Int. Cl.
*F16L 11/12* (2006.01)
(52) U.S. Cl. .................. 285/47; 285/293.1; 264/35; 264/46.6; 264/46.9
(58) Field of Classification Search ............... 264/35, 264/46.6, 46.9; 285/47, 293.1; 138/99, 156
See application file for complete search history.

(56) References Cited

U.S. PATENT DOCUMENTS

| 1,940,729 | A | 12/1933 | Pfefferle |
|---|---|---|---|
| 2,816,323 | A | 12/1957 | Munger |
| 2,937,662 | A | 5/1960 | Green |
| 4,054,158 | A | 10/1977 | Hoeman et al. |
| 4,096,017 | A | 6/1978 | Wyke et al. |
| 4,111,017 | A | 9/1978 | Wells et al. |
| 4,909,669 | A | 3/1990 | Baker |
| 5,199,464 | A | 4/1993 | Savard |
| 5,328,648 | A | 7/1994 | Mc Brien et al. |
| 5,345,972 | A | 9/1994 | Goglio et al. |
| 5,722,463 | A | 3/1998 | Smyth et al. |
| 5,791,378 | A | 8/1998 | Stephens |
| 5,804,093 | A | 9/1998 | Wyke et al. |
| 5,900,195 | A | 5/1999 | Pool et al. |
| 5,947,159 | A | 9/1999 | Takahashi |
| 5,950,683 | A | 9/1999 | Henderson et al. |
| 6,402,201 | B1 | 6/2002 | Pool et al. |
| 7,407,197 | B2 * | 8/2008 | Gronquist .................. 285/47 |

* cited by examiner

*Primary Examiner*—David E Bochna
(74) *Attorney, Agent, or Firm*—Bracewell & Giuliani LLP

(57) ABSTRACT

An apparatus for protecting exposed pipeline joints on weight coated pipelines used in offshore applications includes a pliable cover sleeve which overlaps a pair of weight coat sections that surround the pipeline on each side of the pipe joint. The cover sleeve circumferentially envelops the pipe joint, forming an annular space enclosed between the pipe and the cover sleeve and bordered by the pair of weight coat sections. The cover sleeve includes a number of protruding ridges forming a number of chambers between the ridges in flow communication with the annular space. A joint-filling material of polyurethane foam formed by polyurethane chemicals fills the annular space and the chambers between the ridges of the cover sleeve. As the joint filling material hardens it interlocks with the ridges of the cover sleeve, securing the joint filling material between the cover sleeve and the pipe joint.

23 Claims, 4 Drawing Sheets

PIPELINE JOINT INFILL AND PROTECTIVE SLEEVE

CROSS-REFERENCE TO RELATED APPLICATIONS

The present application is a divisional patent application of U.S. patent application Ser. No. 10/943,578 filed Sep. 17, 2004, now U.S. Pat. No. 7,407,197, which issued Aug. 5, 2008.

FIELD OF THE INVENTION

The present invention relates generally to the protection of exposed pipeline joints of pipelines used in offshore operations, and relates more particularly to a pliable protective cover sleeve securing therein a protective substance in order to protect a pipe joint.

BACKGROUND

It is conventional in the offshore pipeline industry to use weight coated pipe for pipelines which are used on ocean floors or other underwater surfaces. The weight coats traditionally have been made of dense materials such as concrete, and are typically several inches thick around the circumference of the pipe. The weight coats protect the pipeline and provide sufficient weight to maintain the pipeline submerged in a non-buoyant condition.

In most cases, the weight coats are applied to the full length of the pipe except for a short distance where there is a bare pipe end portion, approximately one foot from the end of each pipe section. The end portion of the pipe remains without the weight coat to facilitate welding together individual sections of the weight coated pipe in order to make up the pipeline. In this manner, sections of pipe are placed on a barge and welded sequentially onto preceding sections forming a pipeline extending from the barge. The newly formed pipeline is placed on rollers, and as the barge moves forward, the pipeline is carried over the rollers, then lowered, and then laid on the bed of the body of water.

The portions of pipe not having a weight coat had a corrosion coating applied to the surface of the pipe to prevent the pipe from corroding due to exposure to the elements. Generally, the corrosion coatings used were a heat shrinking tape or a fusion bonded epoxy. After the sections of pipe were welded together, various techniques were used to protect the corrosion coating on the exposed portions of pipe around each joint.

One prior known procedure was to wrap sheet metal over the weight coating adjacent the exposed portion of the pipe and band the sheet metal in place with metal bands. Generally, a zinc coated sheet metal was used. The space between the pipe and sheet metal was then filled with a molten material which would solidify as it cooled. However, in most cases, the pipeline had to be in a condition for handling immediately after the sleeves were filled so that the laying of the pipeline could proceed without delay. The molten filling did not set or harden to a sufficiently strong material within the required time to allow further processing of the pipe and the molten material would leach out into the water if the pipeline was lowered before the molten material was adequately cured.

Other known procedures have typically replaced the molten material with other types of materials. For example, one alternative material utilized to cover the exposed portion of pipe was granular or particulate matter such as gravel or iron ore which did not pack solidly or uniformly. Then elastomeric polyurethanes were injected into the mold to fill the interstices between the granular filler materials. After the polymer material had reacted, the mold would be removed from the surface of the infill.

Another known procedure involves wrapping the exposed portions of pipe with a thermoplastic sheet. The sheet overlapped the ends of the weight coat adjacent the exposed joint and then was secured in place by screws, rivets, or straps. To increase the rigidity and impact resistance, this joint protection system required the installation of reinforcing members such as plastic bars or tubes to the interior of the sheet. The reinforcement bars or tubes either had to be precut and stored on the barge or else cut to the required fitting form as part of the installation process on the barge. Yet another known procedure entailed filling the lower portion of the annular space between the pipe and the plastic sheet with a material such as pre-formed foam half shells.

A more recently used technique involved encasing the pipe joint by circumferentially wrapping a pliable sheet of cover material around the exposed portion of the joint connection. The longitudinal end portions of the pliable cover overlapped the adjacent edges of the weight coating, such that an annular pocket was formed about the exposed joint section. Polyurethane forming chemicals were then injected into the empty annular space where they reacted to form high-density, open cell foam which filled the annular space. The open cell polyurethane foam was intended to absorb moisture and ultimately increase the ballast of the pipeline.

In many cases, vibrations during offshore operations at times could cause the foam to vibrate, and move around, tending to separate the foam from the pipe, because there was no locking mechanism to hold the polyurethane foam securely in its place. Of further concern, the outer diameter portions of the foam were more susceptible to movement, agitation, or damage than the inner diameter portions of the foam, because the outer diameter portions might have a lower density than the inner diameter portions of the foam.

SUMMARY OF THE INVENTION

Briefly, the present invention provides a new and improved apparatus and method for protecting exposed pipe joints on weight coated pipelines used in offshore applications. A pliable synthetic resin cover sleeve overlaps a pair of weight coated sections that surround the pipeline on each side of the pipe joint. The cover sleeve circumferentially envelops the pipe joint, forming an annular space between the pipe and the cover sleeve and longitudinally between the pair of weight coated sections. The cover sleeve includes a number of ridges that extend inwardly from the sheet and form a number of chambers between the ridges. The chambers are in communication with the annular space.

A filler composition is injected into the annular space, and the filler composition undergoes a hardening reaction to form a high density, open cell polyurethane foam. The annular space and the chambers receive the filler composition as it is reacting and the resultant high density, open cell polyurethane interlocks with the ridges in the cover sleeve while hardening. The expansion of the reacting, hardening foam into the chambers produces a locking effect with the structure of the ridges and the resultant polyurethane foam mechanically locks onto the ridges.

The present invention forms a composite system to protect the joint connection with the foam providing continuous compressive reinforcements and impact resistance and the cover sleeve provides puncture resistance and protection from water jetting/post trenching operations plus abrasion resistance. The present invention further provides a better bond between the foam and the cover sleeve, which provides for greater overall stability and reliability.

To better understand the characteristics of the invention, the description herein is attached, as an integral part of the same, with drawings to illustrate, but not limited to that, described as follows.

BRIEF DESCRIPTION OF THE DRAWINGS

A better understanding of the present invention can be obtained when the detailed description set forth below is reviewed in conjunction with the accompanying drawings, in which.

Figure 1:
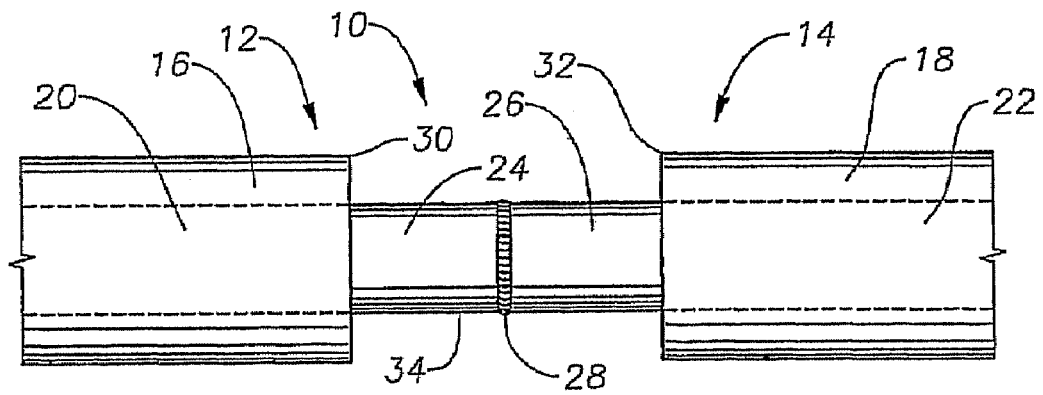
FIG. 1 depicts a side elevation view of a pipeline, showing two sections of weight coated pipe welded together at a pipe joint.

To better understand the invention, we shall carry out the detailed description of some of the modalities of the same, shown in the drawings with illustrative but not limited purposes, attached to the description herein.

DETAILED DESCRIPTION

Although the following detailed description contains many specific details for purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations thereon, the claimed invention.

FIG. 1 shows a conventional, prior art weight coated pipeline 10 formed by welding together two pipe sections 12, 14, each of which is covered by a weight coat 16, 18, respectively. The weight coat 16, 18, which is formed from concrete or another suitable material, completely covers the pipe sections 20, 22 circumferentially and longitudinally except for a portion of each pipe end 24, 26 of the pipe section 20, 22. The pipe ends 24, 26 are left exposed to facilitate welding of the two pipe sections 12, 14 together as sections of a pipeline. However, these exposed pipe ends 24, 26 leave gaps of pipe not coated with weight coat 16, 18 in the pipeline 10, which would be covered only by a corrosion coating 34. The present invention is provided to protect the pipe joint of the pipe ends 24, 26 between the coated pipe sections 16, 18.

Figure 2:
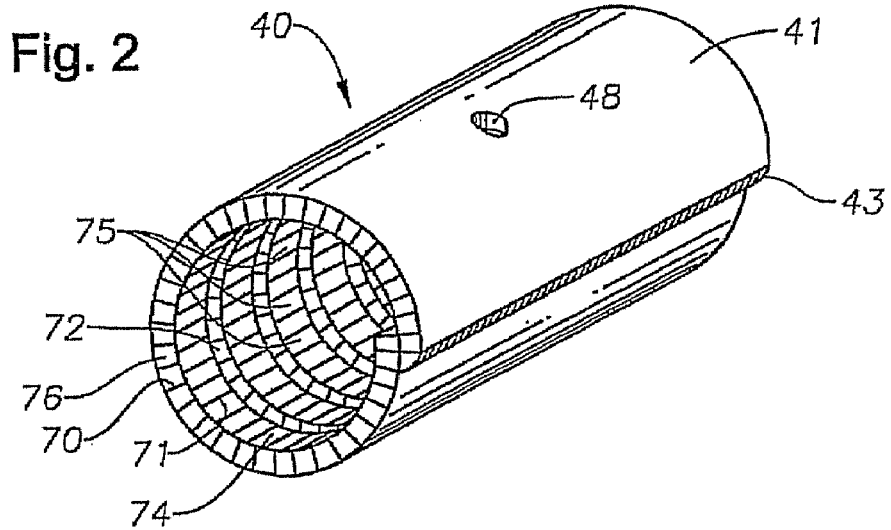
FIG. 2 is an isometric view of a pliable cover sleeve according to the present invention shaped in cylindrical form and used to encase the exposed joint section.

As such, the present invention provides for the utilization of a cover sleeve 40 that is used to enclose and provide structural protection for the exposed corrosion coating 34 on the pipe end 24, 26. As shown in FIG. 2, the preferred embodiment uses a cover sleeve material 40 that is pliable, yet strong, and which can be formed into a cylindrical shape to fit around the pipeline 10. The coated end portion 16 is not shown in FIG. 2 and the coated end portion 18 is shown in phantom so that structure of the cover sleeve 40 may be more clearly seen. The cover sleeve material 40 is formed from a high-density synthetic resin, polypropylene, polyethylene, or other alternative thermoplastic material. The cover sleeve 40 should be at least approximately 0.2 mm thick and may be considerably thicker if stronger support and impact resistance is desired. Water depth, pipe size, pipe weight and other considerations may dictate the use of a cover sleeve 40 which is up to approximately 12 mm in thickness. The cover sleeve 40 may be a flexible flat sheet or may be preformed into a cylindrical shape.

An example of a suitable cover sleeve 40 is a sheet material in the form of a twin wall profile extrusion made from polyethylene or polypropylene that is manufactured, for example, by Primex Plastics Corporation, Richmond, Ind., and which may be identified by the brand name Cor-X. Sheet materials of this type can be extruded in thickness ranges of 0.006 to 0.5 inches. The sheet material used for the cover sleeve 40 is modified in a manner described below in order to permit ease of access of a joint infill or filler substance into the structure of the cover sleeve 40 and also to permit mechanical interlocking of the protective sleeve and the joint infill material. It should also be understood, as will be described in greater detail below, that the structure of the cover sleeve 40 may take a number of shapes to achieve such mechanical interlocking.

For example, the cover sleeve material 40 may take the form of a wall 41 and a wall 42 spaced from and interconnected to each other by a series of ribs or ridges 44 between two outer layers arranged to extend over the length of the sleeve material 40 in a direction corresponding to the longitudinal axis of the pipeline 10. Spaces between the walls 41 and 42 and adjacent ribs or ridges 44 thus take one form of a number of longitudinally extending tubes or passages 45. As will be set forth below, portions of the wall 42 are removed or opened along both the longitudinal and transverse extent of the sheet material 40. As a result when sheet material is formed into a cylindrical cover sleeve 40, the tubes, or passages 45 take the form of chambers which are in flow communication with an annular space 54 formed between the sleeve 40 and the pipe 24, 26.

The pliable cover sleeve 40 is wrapped into a cylindrical shape around the exposed pipe ends 24, 26 such that the outer diameter of the cylinder of cover sleeve 40 is slightly greater than the outside diameter of the weight coat 16, 18 on the pipeline 10. More specifically, the inside diameter of the cylinder of cover sleeve 40 is substantially the same as the outside diameter of the weight coat 16, 18. The cover sleeve 40 should be long enough to overlap the adjacent ends or edges 30, 32 of both sides of the weight coating 16, 18 by several inches to allow the weight coating 16, 18 to act as a structural support for the cover sleeve 40. Once the cover sleeve 40 is fitted over the adjacent edges 30, 32 of the weight coat 16, 18, the longitudinal side edges 41 and 43 of cover sleeve 40 are tightly pushed together such that the side edges 41, 43 overlap. The cover sleeve 40 may be tightened down and held in place on the ends of the weight coat 16, 18 with conventional removable cinch belts (not shown) or some other form of securing structure. The outside edge 43 is then sealed to the surface of the cover sleeve 40 and the cylindrical, externally sealed cover sleeve 50 is formed.

Figure 3:
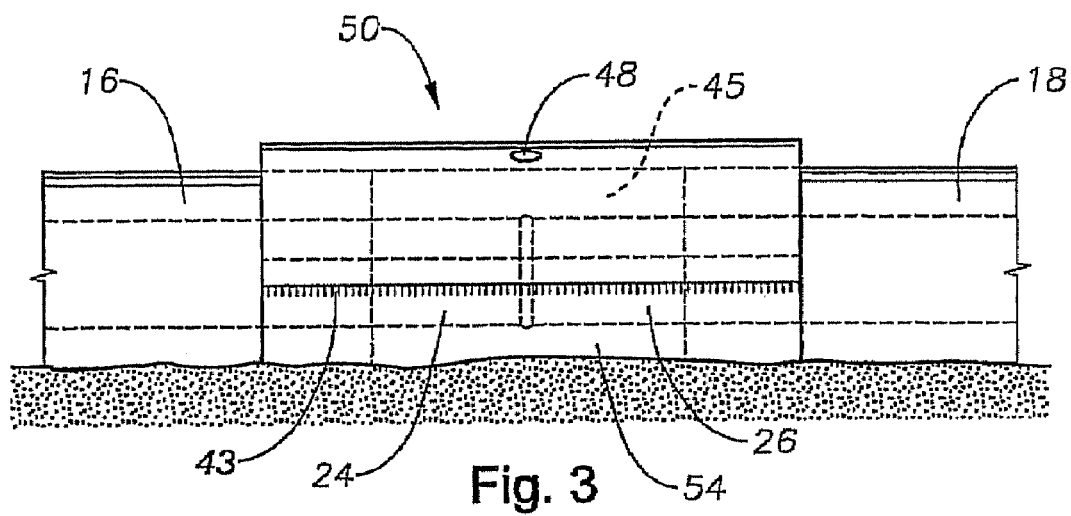
FIG. 3 is a side elevation view of a pipeline, showing a pliable cover sleeve according to the present invention wrapped and sealed around the exposed joint section.

The cover sleeve 40 can be sealed by plastic welding an edge onto the surface of the cover sleeve 40, forming a longitudinally extending plastic weld 43 the entire length of the cover sleeve 40 as shown in FIG. 3. Alternative techniques for sealing such as heat fusion, riveting, gluing, taping, or banding can also be utilized to seal the cover sleeve 40.

Referring to FIG. 3, the cover sleeve 40 thus becomes the cover sleeve 50, sealed by the outer wall 41 forming a protective barrier around the exposed portion of pipe 24, 26 and remaining a permanent part of the pipeline 10. The annular space 54 is thus formed around the pipe 24, 26 by installing the sealed cover sleeve 50. The annular space 54 so formed between the pipe 24, 26 and the sealed cover sleeve 50 extends longitudinally between the weight coat portions 16, 18.

A hole 48 is formed in the sealed cover sleeve 50, through which reactive chemicals or compositions are injected into the annular space 54 to form a joint-filler substance or composition 62. The composition 62 is comprised of polyurethane chemicals of the type disclosed, for example, in U.S. Pat. No. 5,900,195 as described below. The hole 48 may be drilled, cut, or otherwise completed in the cover sleeve 50 to thereafter allow the yet-to-be reacted chemical or substance 62 to be injected into the annular space 54. The hole 48 may be precut into the cover sleeve 40 prior to installation on the weight coated pipeline 10 or may be cut after the sealed cover sleeve 50 is in place. The diameter of the hole 48 to be drilled is dependent upon the particular type of mixing head used to inject the reactive chemical or substance 62. Industry standard or conventional injection heads are acceptable, but suitable alternatives would also suffice.

Figure 4:
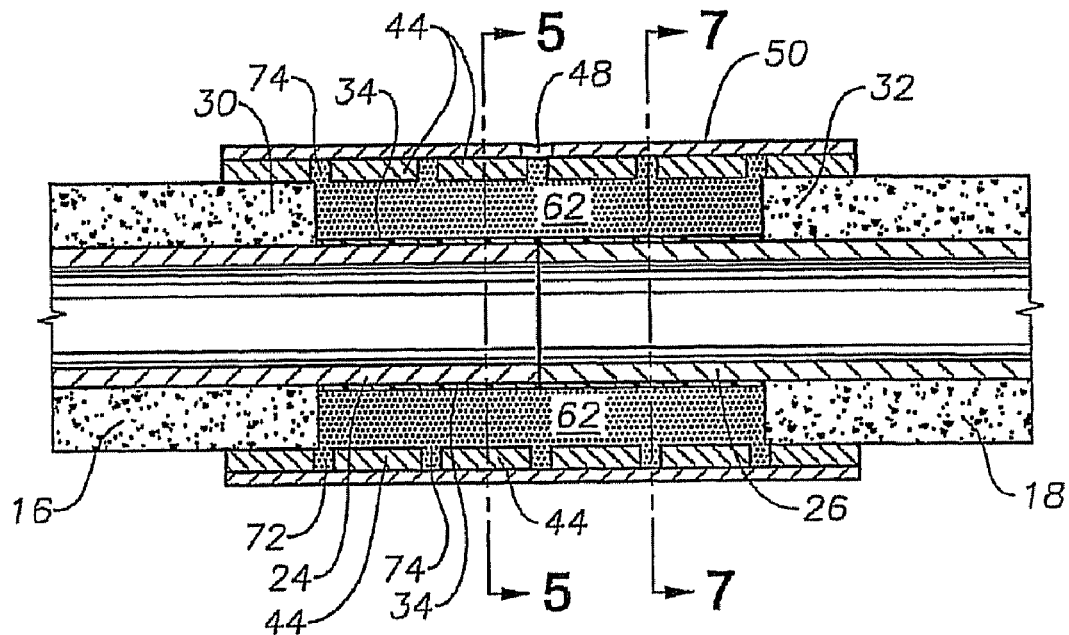
FIG. 4 is a vertical cross sectional view of the pipeline and cover sleeve of FIG. 3.

As shown in FIG. 4, the annular space 54 is filled through hole 48 by a mixing head with reactive chemicals or compositions, preferably those causing a reaction of components, such as those disclosed in U.S. Pat. No. 5,900,195. The composition 62 formed by such a reaction is, as a result, a high-density rapid-setting polypropylene or polyurethane foam system 62. The foam 62 serves as a shock absorber and protects the corrosion coating on the pipe 24, 26. Also, because the foam 62 is open celled, it can absorb water and increase the ballast effect for the pipeline 10. Alternatively, other polymerizing or hard setting compounds such as marine mastics, quick setting concretes, polymers, or elastomeric compounds may be used to fill the annular space 54. Any alternative filler substance 62 typically is quick hardening, such that the process of laying the pipeline 10 is not inhibited.

The preferred polyurethane or polypropylene system utilized to form the protective high-density foam 62 in this process is a combination of an isocyanate and a polyol system. When reacted, this combination system rapidly cures and forms high-density open celled polyurethane or polypropylene foam 62, which resists degradation in seawater. The isocyanate is a polymeric form of diphenylmethane diisocyanate, as manufactured, for example, by Bayer Corp. The preferred polyol system is a mixture of multifunctional polyether and/or polyester polyols, catalysts for controlling the reaction rate, surfactants for enhancing cell formation, and water for a blowing agent. The blended polyol system is manufactured, for example, by Dow Chemical Co., Bayer Corp., and other companies.

The preferred system produces foam 62 with a density of about 8 to 10 pounds per cubic foot and has about eighty percent or greater open cells. The compressive strength of the preferred foam 62 is approximately 200 psi or greater at 10 percent deflection and 2000 psi or greater at 90 percent deflection. Reaction of the preferred system components can be characterized by a 18 to 28 second cream time, the time between discharge from the mixing head and the beginning of the foam rise, a 50 to 60 second rise time, the time between discharge from the mixing head and the complete foam rise, and a 240 to 250 second cure time, the time required to develop the polymer strength and dimensional stability.

The cover sleeve 50 acts as a mold and receives the foam 62 in the annular space 54 and chambers 45, and further interlocks and forms a mechanical bond with the foam 62 as it is cured. As shown in FIG. 4, preferably this foam 62 substantially fills the annular space 54 and chambers 45 without leaving significant void areas. Preferably, no additional filler materials are needed to be used in conjunction with the foam 62. The foam 62 should substantially fill the annular space 54 and protrude to some extent upward through the hole 48 on the sealed cover sleeve 50.

Referring to FIG. 4, the sealed cover sleeve 50 together with the foam 62 provide a protective system which protects the exposed pipe 24, 26 and the corrosion coating 34 during handling and laying of the pipeline 10 and continues to provide protection from damage due to drag lines or trawler boards attached to fishing trawler nets. Further, the sealed cover sleeve 50 is not subject to the corrosion problems of prior systems and therefore does not create an underwater hazard or a danger to fishing nets. Additionally, the protective system provided by the present invention acts to deflect the high pressure water jets used to bury pipelines in shallow waters which have resulted in damage to the corrosion coating on pipe joints protected by prior systems.

Figure 5:
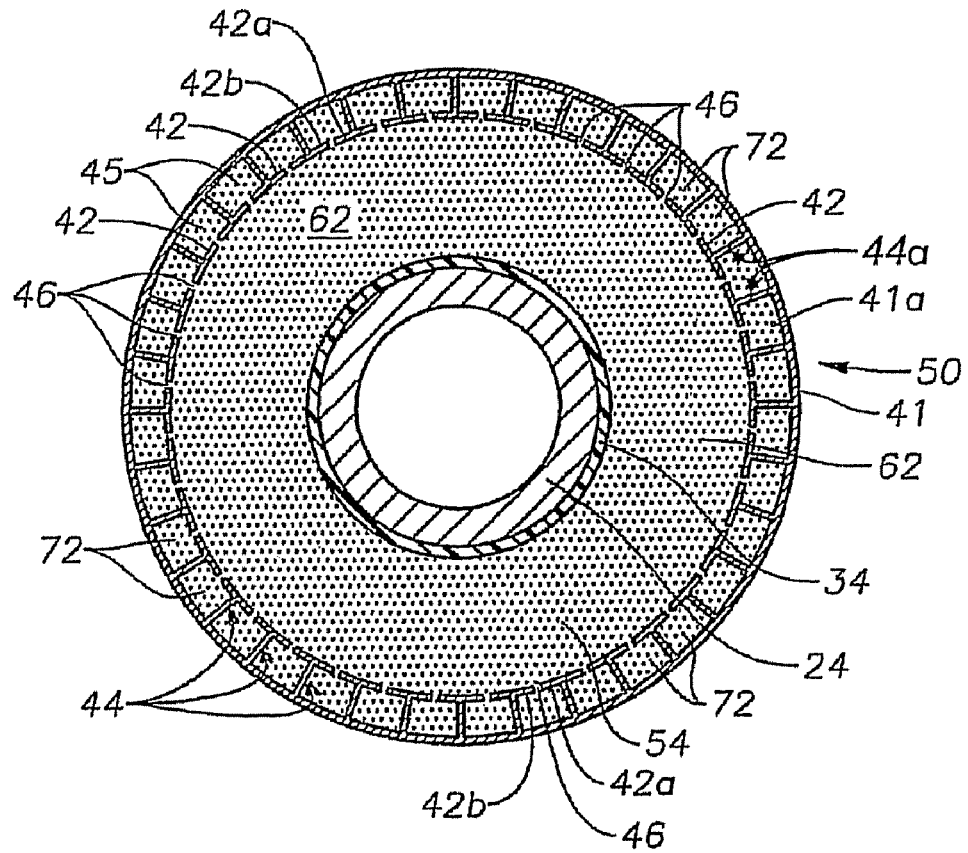
FIG. 5 depicts a vertical cross sectional view taken along the lines 5-5 of FIG. 4, showing a locking mechanism of the cover sleeve interlocked with the joint-filling material.
Figure 6:
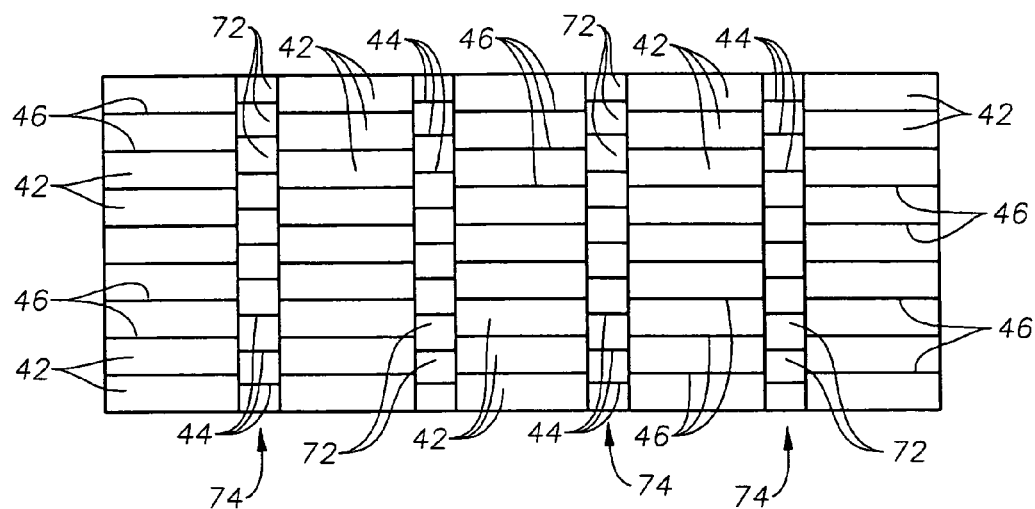
FIG. 6 shows a plan view of an unwrapped cover sleeve like that of FIG. 2 in accordance with the present invention.
Figure 7:
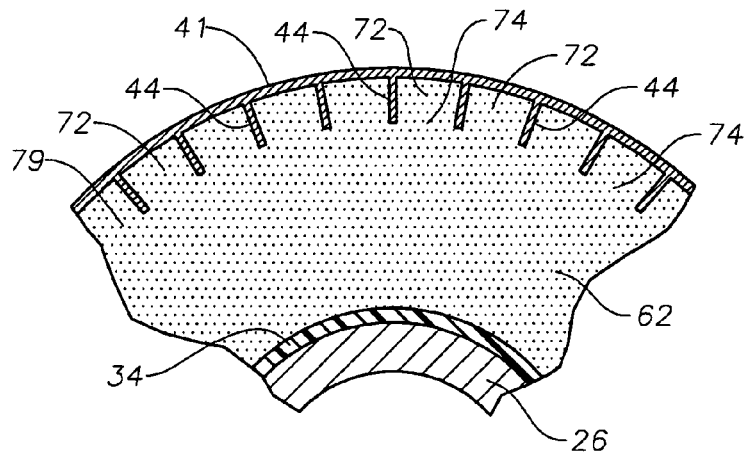
FIG. 7 is a vertical cross-sectional view, like that of FIG. 5, but along the lines 7-7 of FIG. 4.

FIG. 5 depicts an axial cross section along the lines 5-5 in accordance with a preferred embodiment of the invention, showing the cover sleeve 50 filled and interlocked with the expanded, cured protective foam substance 62. The wall 41 of cover sleeve 50 now serves as an outer wall of the cylindrical cover sleeve 50 and thus exhibits a smooth exterior. The ribs or ridges 44 of the cover sleeve 50 thus extend radially inwardly from an inner surface 41*a* of wall 41 in the assembled cylindrical cover sleeve 50 with the chambers 45 between them for receiving the protective foam substance as indicated at 72. The size of the chambers 45 or and thus relative presence, or chambers-per-linear-foot extending in a circumferential manner around the interior of sleeve 50 may be varied according to needs of a particular pipeline. For example, the relative number may range from about fifty chambers per twelve inches to eighty or more chambers per twelve inches for walls 41 and 42 of cover sleeve 50 which may range in thickness from about 2 mm through about 6 mm. Further, cover sleeves 50 with wall thickness of from seven mm through twelve mm typically contain about thirty chambers per twelve inches.

As shown in FIG. 5, the structure of cover sleeve 50 has the walls 41 and 42 connected by ridges 44 that hold the inner and outer walls together. The sleeve material is then modified such that a series of longitudinal cuts or slices 46 are formed extending through the inner wall 42 in a direction corresponding to the axis of the pipeline 10.

In addition, circumferential bands of the inner wall 42 are removed at longitudinally spaced positions as indicated at 74. The longitudinally spaced positions can be relatively closer or further apart and the width of the circumferential band removed from inner wall is usually from ⅛ inch to about two inches along the interior of the cover sleeve for ease of entry of the reacting chemicals of the foam 72 into the chambers 45. The inner wall 42 may be modified such that longitudinally extending portions or are removed between certain of the ridges 44. The inner wall 42 thus may have a series of channels, as shown in FIG. 2 at 75.

The cover sleeve 50 is thus a permanent outer cladding with from about ten to twenty circumferentially spaced ridges per square inch of the annular extent of the cover sleeve 50, forming chambers 45 in flow communication with the annular space 54 being filled with the chemicals reacting to form the polyurethane foam 62. FIGS. 5, 7, 8, 9, and 10 depict several possible embodiments forms suitable for the ridges according to the present invention. Generally the ridges have some portion extending in a direction transverse to a radial direction inwardly from the wall 41 toward the longitudinal axis of the pipeline 10 and cylindrical sleeve 50. Thus, the ridges may take various forms, generally in the form of two portions, one of which is transverse the other in their final extent or location in the cured foam filing portions 62 and 72; or extending in a curved or arcuate direction away from the cylindrical inner wall; or in some combination of these or similar forms. It is desirable that some parts or portions of the structure of the ridges in their final location in the cured foam extend in a direction transverse that of a radius of the cylindrical sleeve 50. In this manner, cured foam is located on each side of some portion of the ridges, thus interlocking with the inner structure of the ridges, sleeve rather than relying on physical bonding between cylindrical surfaces of the foam and the sleeve, as in previous infill coatings.

The ridges 44 may be generally inverted T-shaped, as shown in FIG. 5, formed as a result of the slices 46 mentioned above with a first portion 44a of the ridges 44 extending inwardly from the inner surface 41a of the outer wall 41. In the embodiment of FIG. 5, second portions 42a and 42b of the inner wall 42 on each side of the slices 46 extend transversely and generally substantially perpendicularly to the ridges 44. The portions 42a and 42b thus extend perpendicularly across the ridges 44 as shown in FIG. 5. As can also be seen, the ridges 44 formed in this manner have an inverted T-shape in their extent inwardly into and interlocking engagement with the cured foam 62 and 72.

Figure 8:
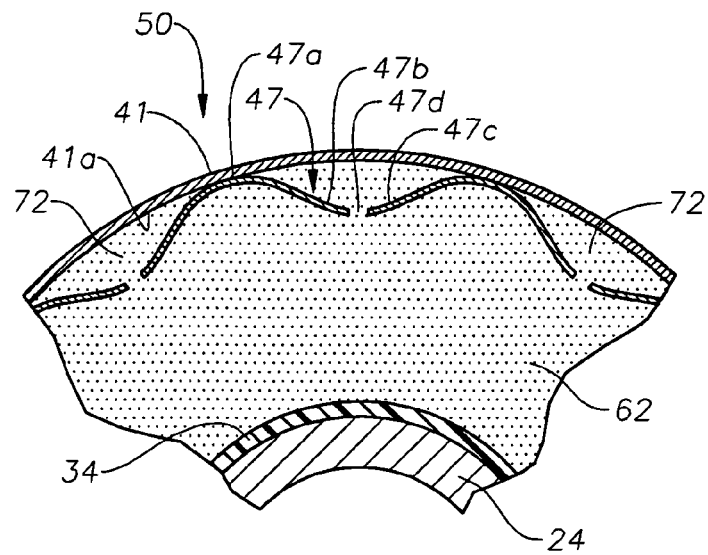
FIGS. 8, 9, and 10 are vertical cross-sectional views of alternative embodiments of the cover sleeve according to the present invention interlocked with the joint-filling material.

It should also be understood that the wall portions of the ridges to interlock with the foam may take a variety of other configurations. As examples, the cover sleeve 50 may have ridges 47 (FIG. 8) or 48 (FIG. 9) extending inwardly therefrom in the shape or design of a loop or a curved web extending in arcuate form from the cover sheet 50. The webbed ridges 47 and 48 each have a space for the components reacting and forming the foam 62 to penetrate the chambers 72 and interlock with the ridges 47 and 48. The arcuate segments 48 (FIG. 9) are circumferentially disposed along the inner wall surface 41a of the cover sheet 50, with alternate sets of the arcuate segments 48 formed with inner end portions spaced from each other to form a space 48b for entry of foam into the chambers 54. In the embodiment of FIG. 8, the ridges 47 extend inwardly from the cover sleeve 50 in a somewhat comparable manner as do corrugation layers formed in cardboard materials. In the embodiment of FIG. 10, ridges 49 extend inwardly from the cover sleeve 50 in a generally hook-shaped manner. In each of the embodiments of the present invention, the chemicals reacting and causing the form 62 to be formed are able to enter the chambers 72 through the spaces shown between adjacent ridges or adjacent ones of the various ridges extending inwardly from the cover sleeve 50.

Turning now in greater detail to the embodiment shown in FIG. 8, the ridges may be formed as a series of arcuate segments extending inwardly from the cover sheet. The arcuate segments may take the form of undulating or wave-shape in vertical cross-section circumferentially disposed along the inner surface 41a of the wall 41 of cover sheet 40, as shown at 47 in FIG. 8, with a central portion 47a mounted with or formed as an integral portion of the outer wall 41 and having two curved or arcuate segments 47b and 47c extending inwardly to be received in and interlock with the chemicals as they react to cause formation of the cured foam 62. The arcuate segments 47b and 47c may result from forming longitudinal cuts or slices, leaving spaces 47d in a wave-shaped sheet of material 47. Alternatively, the ridges may be in the form of a number of separate arcuate segments 47 mounted at spaced locations as shown at 47d from each other.

Figure 9:
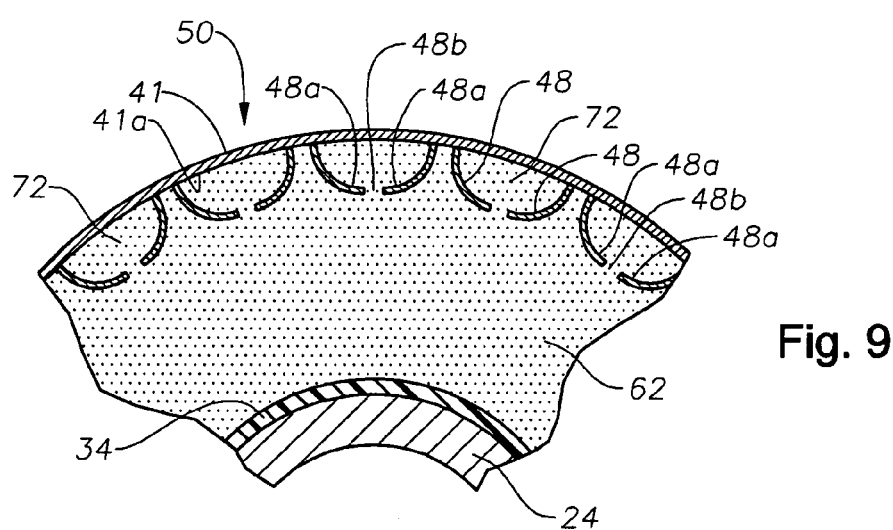
Figure 10:
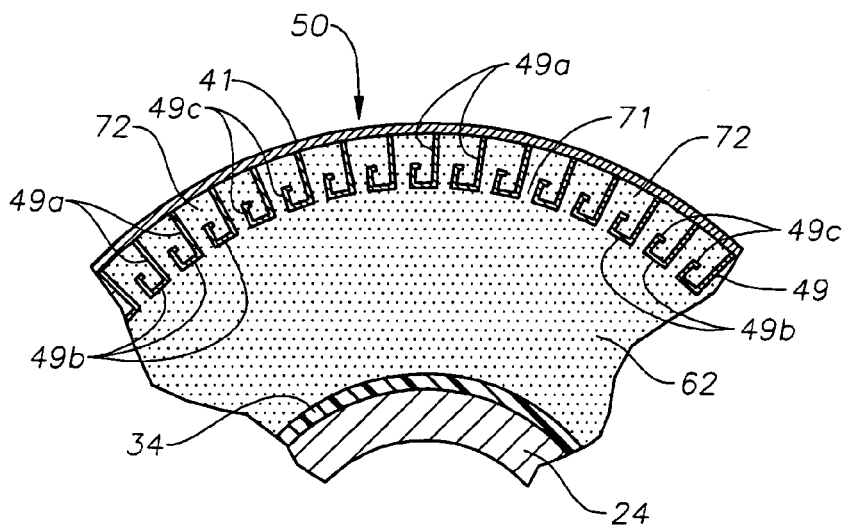

Further, as has been discussed, the ridges may take the form of a series of arcuate segments, such as curved wall members 48 (FIG. 9). As shown in detail in FIG. 9, the curved wall members 48 are formed extending in arcuate form circumferentially disposed and extending inwardly from inner surface 41a of the cover sheet with alternate sets of the curved wall members 48 having end portions 48a spaced from each other as shown at 48b to form chambers 45 in the flow communication with the annular space 54 to receive the foam 62 and 72.

Further, in another embodiment shown in FIG. 10 ridges according for protective covers for joint infill according to the present invention may take the form of inverted-L or hook shape as shown at 49 in FIG. 10, with a first portion 49a extending inwardly from the inner surface 41a of the outer wall 41. A second portion 49b of the ridge 49 extends transversely or perpendicularly to the first portion 49a, with an optional third portion 49c extend generally radially inwardly to the wall 41, leaving a space 71 providing flow communication for the foam 72.

It should also be understood that in the embodiments of FIGS. 8-10, circumferential bands as indicated at 74 and, where applicable, channels 75, are typically present to provide flow communication so that the foam 62 as it is forming and cures penetrates and fills the chambers 45 as shown at 72. The resultant foam in chambers 45 engages, interlocks, and substantially bonds with the ridges 70 in the interior of the cover sleeve 50. As the foam 62 reacts to fill the annular space 54, it also expands and substantially penetrates the chambers 45 formed by the ridges 44. The present invention provides thus for a better mechanical bond at the interface between the polyurethane or polypropylene foam 62 and the cover sleeve 50.

It should be understood that the ridges 44 extending inwardly from the cover sleeve 50 may take a number of forms according to the present invention. For example, the invention cover sleeve 50 need not have both longitudinal cuts 46 and circumferential bands 74 for flow communication from the annular recess 54 into the chambers 45. The cover sleeve 50 may thus be provided with only longitudinal cuts 46 or circumferential bands in inner wall 42 for fluid communication.

It should be understood that the Figures of the present invention are generally not drawn according to scale with respect to the relative sizes of various structural elements shown. Rather, the relative size of some of the structural elements are enlarged in comparison to other structure in order to more clearly illustrate the features of such structural elements. For example, in FIGS. 5 and 7-10, the ridges are enlarged in comparison to cover sleeve 50 in order to more clearly illustrate the structure of the ridges and their interlocking with the filler foam substance 62.

From the foregoing, it can be seen that the present invention provides an apparatus and method for protecting the corrosion coating 34 on exposed pipeline joints such as 12, 14 on weight coated pipelines 10 used in offshore applications. The cover sleeve 50 and the foam 62 work together to protect the joint connection. The aforementioned methodology allows quick installation on a lay barge where pipeline sections 24, 26 are being welded together for offshore installation. The present invention further provides a locking mechanism to secure the foam 62 inside the cover sleeve 50, thus preventing the foam 62 from subsidence away from the cover sleeve 50, or movement or agitation relative to the pipe in a circular or circumferential manner around the pipe, which otherwise may occur from vibrations occurring during offshore operations.

Moreover, because the outer diameter portions of the foam 62 may have a lower density than the inner diameter portions of the foam 62, prior embodiments in the art indicate that the outer diameter portions of the foam 62 are more susceptible to movement or agitation relative to the pipe than the inner diameter portions of the foam 62. For this reason, the positioning of the locking mechanism on the outer side of the foam 62, rather than on the inner side of the foam 62, should be regarded with considerable importance.

The invention can be used for pipe joints that are part of a pipeline located on the floor of a body of water. The invention can be used in many applications, including use as a deep water insulation joint infill, and as a deep sea abrasion sleeve. In this manner, a better, more secure, and more stabilizing bond is formed between the foam 62 and the cover sleeve 50, which provides greater overall stability and reliability during offshore operations. Thus, the present invention improves the performance of pipelines where pipe ends 24, 26 are welded together on pipelines coated with concrete weight coating 16, 18 and installed on the seabed in large bodies of water.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

That which is claimed is:

1. A method for protecting a pipe joint of a pipeline, comprising:
    wrapping a cover sheet circumferentially about the pipe joint, the cover sheet having a plurality of chambers formed along an inner surface by a plurality of ridges extending inwardly;
    forming an annular space between the pipe joint and the wrapped cover sheet with the chambers between the ridges in communication with the annular space;
    introducing into the annular space a joint filling material in the form of chemicals which are adapted to react and form a high density, open cell polyurethane foam;
    allowing the chemicals of the joint filling material to react and form a high density, open cell polyurethane foam;
    allowing the reacting chemicals of the joint filling material to expand and be contained in the annular space and the chambers; and
    interlocking the high density, open cell polyurethane foam formed by polyurethane chemicals in the annular space with the ridges on the cover during the step of allowing the reacting chemicals to expand and be contained in the annular space and the chambers.

2. The method of claim 1, wherever the pipeline has a plurality of pipe joints along its length, and wherein:
    the step of wrapping comprises wrapping cover sheets about the individual ones of the plurality of pipe joints.

3. The method of claim 2, wherein:
    the step of forming an annular space comprises forming an annular space within the wrapped cover sheets.

4. The method of claim 3, wherein:
    the step of introducing comprises introducing a joint filling material into the annular space within the wrapped cover sheets.

5. The method of claim 1, wherein portions of the ridges are removed along the longitudinal extent of the annular space between the coated pipe sections, and further including the step of:
    allowing the reacting chemicals to flow into the areas where the portions of the ridges are removed.

6. The method of claim 1, wherein portions of the inwardly extending ridges are removed around the annular space formed about the pipe joint by the cover sheet, and further including the step of:
    allowing the reacting chemicals to flow into the areas where the portions of the inwardly extending ridges are removed.

7. A pipeline with at least one protected pipe joint along its length, comprising:
    a plurality of coated pipe sections located on the floor of a body of water, adjacent ones of the coated pipe sections being connected end-to-end to form the pipe joint;
    a pliable synthetic resin cover sheet mounted on the pipe joint and overlapping the coated pipe sections and enveloping the pipe joint, forming an annular space about the pipe joint between the coated pipe sections;
    the pliable synthetic resin cover sheet having a plurality of ridges extending inwardly from the cover sheet into the annular space about the pipe joint and forming a plurality of chambers between the ridges;
    the chambers being in flow communication with the annular space;
    the annular space containing a joint filling material of a high density, open cell polyurethane foam formed by polyurethane chemicals extending circumferentially around and enclosing the pipe joint;
    the chambers containing a joint filling material extending outwardly to the cover sleeve from the joint filling material in the annular space; and
    the joint filling material interlocking with the ridges in the cover sheet to improve the bond between the joint filling material and the cover sheet protecting the pipe joint.

8. The apparatus of claim 7, wherein portions of the ridges are removed along the longitudinal extent of the annular space between the coated pipe sections for flow of the polyurethane chemicals into the chambers.

9. The apparatus of claim 7, wherein portions of the inwardly extending ridges are removed around the annular space formed about the pipe joint by the cover sheet for flow of the polyurethane chemicals into the chambers.

10. The apparatus of claim 7, wherein the ridges extend along the longitudinal extent of the annular space between the coated pipe sections.

11. The apparatus of claim 7, wherein a first portion of the ridges extends inwardly from the cover sheet.

12. The apparatus of claim 7, wherein the ridges comprise curved wall members extending in arcuate form from the cover sheet.

13. The apparatus of claim 7, wherein the ridges comprise wall members having a web-shape in cross-section in their inward extent into the annular space.

14. The apparatus of claim 7, wherein the ridges comprise wall members having a hook-shape in cross-section in their inward extent into the annular space.

15. The apparatus of claim 7, wherein the ridges comprise a series of arcuate segments extending inwardly from the cover sheet.

16. The apparatus of claim 7, wherein alternate sets of the series of arcuate segments are formed with inner end portions spaced from each other to form chambers.

17. The apparatus of claim 7, wherein a portion of the ridges extends radially inwardly from an inner surface of the cover sheet.

18. The apparatus of claim 7, wherein the cover sheet comprises an inner cover wall and an outer cover wall.

19. The apparatus of claim 18, wherein the ridges extend between the inner cover wall and the outer cover wall.

20. The apparatus of claim 7, wherein the pliable synthetic resin cover sheet comprises a polyethylene material.

21. The apparatus of claim 7, wherein the ridges are spaced from each other about a circumferential extent on an inner surface of the pliable synthetic resin cover sheet.

22. The apparatus of claim 7, wherein the ridges extend longitudinally in a direction of an axis of the pipe.

23. In a pipeline beneath a body of water having a pipe joint formed between adjacent joined end sections of weight coated pipe, the improvement comprising:
- a protective sleeve enclosing the joined pipe end sections, the sleeve comprising:
  - a pliable synthetic resin cover sheet circumferentially enveloping the joined pipe end sections, forming an annular space about the pipe end sections;
  - a plurality of ridges extending inwardly from the pliable synthetic resin cover sheet and forming chambers between the ridges;
  - the chambers being in flow communication with the annular space; and
- the annular space and the chambers receiving a high density, open cell polyurethane foam formed by polyurethane chemicals interlocking with the ridges to form the protective sleeve to improve the bond between the joint filling material and the cover sheet protecting the pipe joint.

* * * * *